Aug. 17, 1937.   F. A. PARKHURST   2,090,404
MACHINE FOR EXTRUDING PLASTIC MATERIAL
Filed Oct. 22, 1936   2 Sheets-Sheet 1
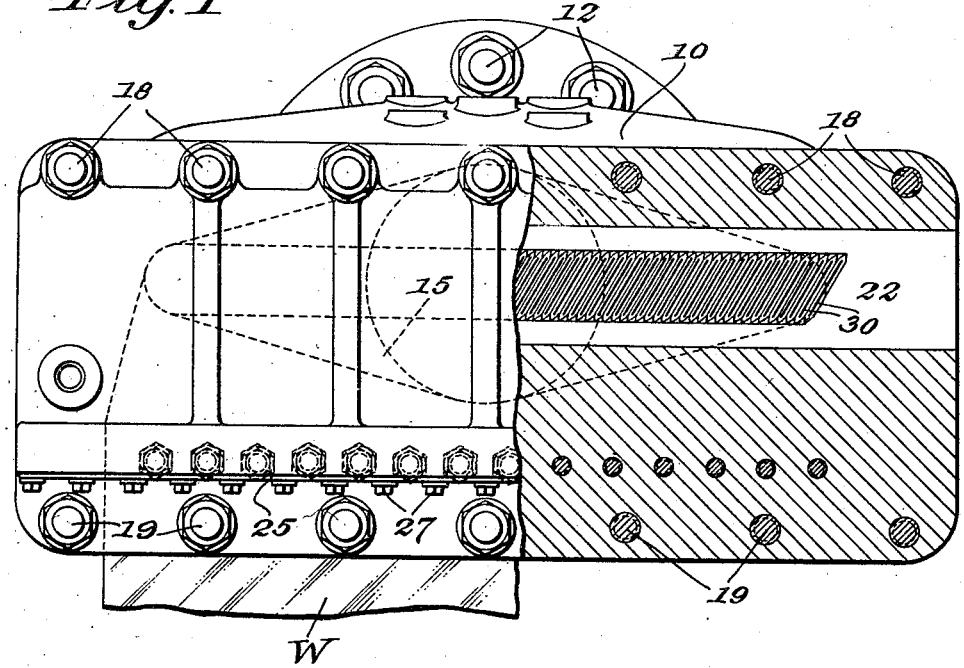
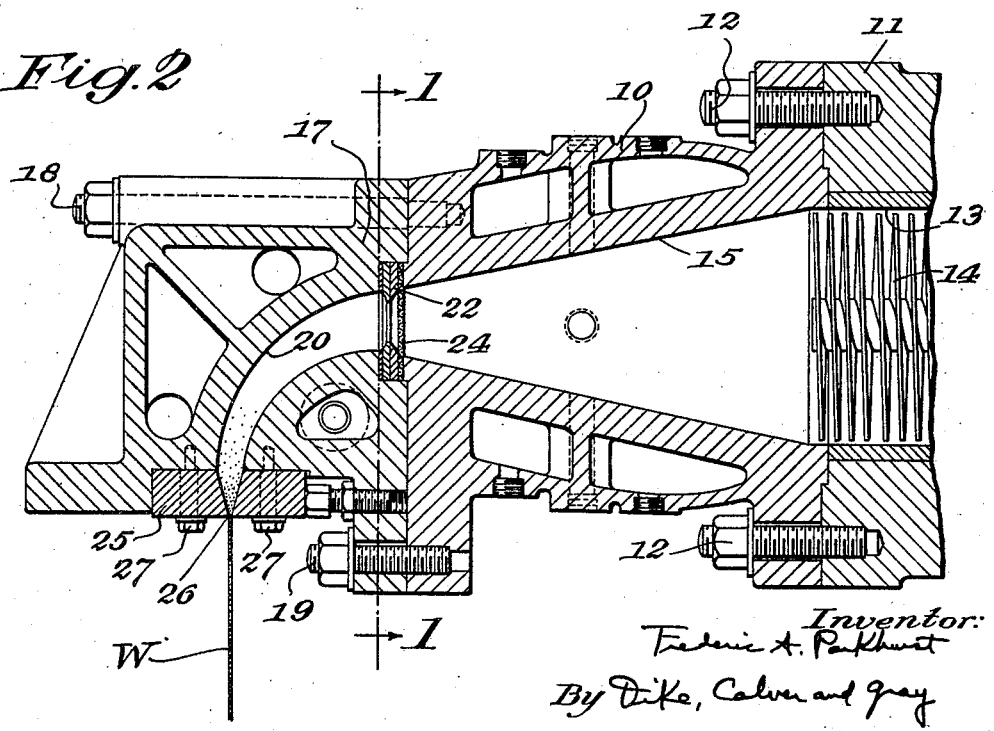
Inventor:
Frederic A. Parkhurst
By Dike, Calver and Gray
Attorneys.

Aug. 17, 1937.  F. A. PARKHURST  2,090,404
MACHINE FOR EXTRUDING PLASTIC MATERIAL
Filed Oct. 22, 1936  2 Sheets-Sheet 2
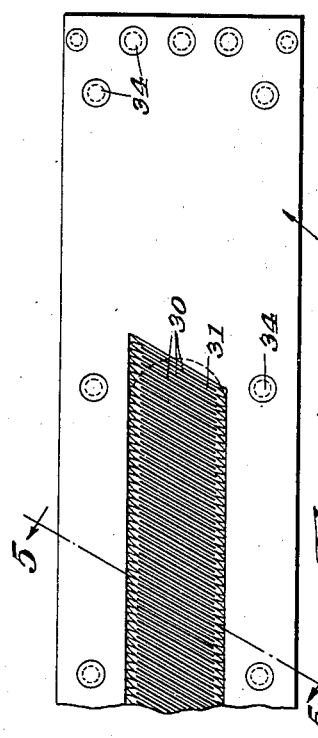
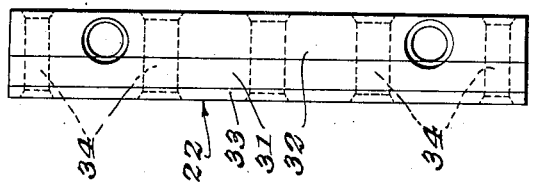
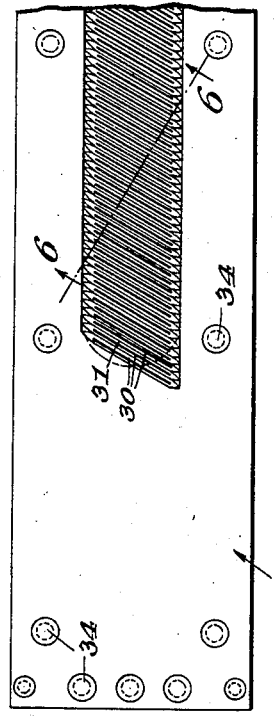
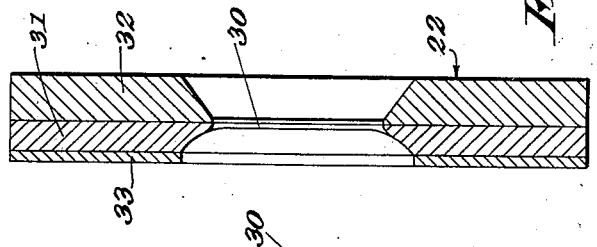
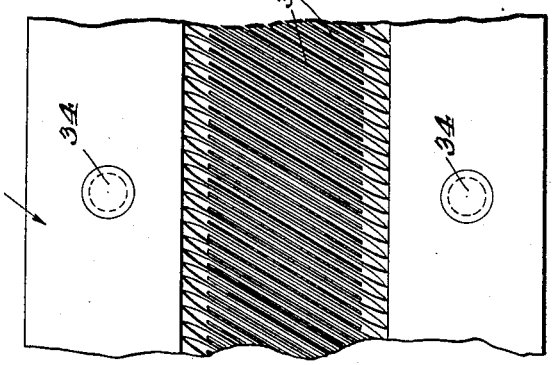

Patented Aug. 17, 1937

2,090,404

UNITED STATES PATENT OFFICE 2,090,404

MACHINE FOR EXTRUDING PLASTIC MATERIAL

Frederic A. Parkhurst, Bethesda, Md., assignor to The Fiberloid Corporation, Indian Orchard, Mass., a corporation of Massachusetts Application October 22, 1936, Serial No. 106,993

2 Claims. (Cl. 18—12)

This invention relates to apparatus for forming a web or sheet by extruding plastic material, such as a cellulose ester, under heavy pressure through a slot orifice having a length and width corresponding substantially to the desired width and thickness of the sheet to be formed.

My co-pending application Serial No. 748,459, filed October 16, 1934, describes an apparatus of this character which is adapted to produce a sheet or web of great uniformity in thickness. In the production of a translucent sheet or web in such apparatus, particularly with certain mixtures, there is a tendency for variation in the translucence of the formed sheet.

It is an object of the present invention to overcome this difficulty and provide an apparatus adapted to form a flat sheet or web of uniform translucence.

The invention will be more clearly understood from the following description in conjunction with the accompanying drawings: in which, Fig. 1 is an end elevational view, partly in section taken upon the line 1—1 of Fig. 2, of an apparatus embodying the invention;

Fig. 2 is a longitudinal sectional elevational view of the apparatus;

Fig. 3 is a detail elevational view of one of the parts;

Fig. 4 is an enlarged fragmentary detail front view of a portion of the part shown in Fig. 3;

Figs. 5 and 6 are sectional views taken upon the lines 5—5 and 6—6 of Fig. 3; and Fig. 7 is a side elevational view of the part shown in Fig. 3.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

An apparatus embodying the invention, as illustrated in the accompanying drawings, comprises a casing 10 which is secured to the outlet end of an extrusion press 11 by bolts 12. The extrusion press 11 is provided with a substantially cylindrical passage 13 in which a feed screw 14 is rotatably movable for feeding the plastic stock through and from the press. The casing 10 is provided with a passage 15 which communicates at one end with the passage 13 of the extrusion press. A casing 17 is suitably secured to the other end of the casing 10 by bolts 18 and 19 and is provided with a passage 20 forming a continuation of the passage 15. The end of the casing 17 adjacent the casing 10 is provided with a recess to receive and hold an obstruction, such as a perforated baffle 22. If desired, a screen 24 may also be interposed between the baffle 22 and the casing 10. A plate or die lip 25 having a slot orifice 26 adapted to register with the passage 20 is secured upon the casing 17 by bolts 27. The passages 15 and 20 provide a continuous passage between the extrusion press and the orifice 26, the width and depth of which gradually increases and decreases respectively so as to approach progressively that of the orifice. This continuous passage is unobstructed except by the apertured baffle 22.

In accordance with the present invention the baffle 22 is provided with a plurality of apertures in the form of narrow elongated slots 30 which are closely positioned and arranged in parallel relation and at an inclination with respect to the edges of the baffle. Collectively the slots 30 form a substantially elliptical passage through the baffle providing communication between the passages 15 and 20. Preferably, the slots 30 are arranged at an inclination of about 60 degrees to the major axis of this passage through the baffle. As illustrated, the baffle 22 is formed of three parts comprising a plate 31, in which the slots 30 are formed, a backing plate 32 and top plate 33 which are suitably secured to the plate 31, as by rivets 34.

In the operation of the apparatus, any desired plastic material, such as a cellulose ester, is fed under heavy pressure by the screw 14 through the passage 15 and the slots 30 in the baffle 22 and through the passage 20 and is extruded through the slot orifice in the form of a continuous sheet or web W. As the stream of plastic material passes through the slots in the baffle 22 it is divided into a plurality of over-lapped webs in which the edges of adjacent webs are displaced in the direction of the width of stream of the plastic material. This is brought about by the inclination of the narrow parallel elongated slots 30 in the baffle. After passing through the slots 30, the various webs are pressed together and pass through the orifice 26 thereby thoroughly blending the mix and eliminating any striation effect in the formed web. The translucence of a web thus formed has been found to possess good uniformity.

I claim:

1. In an apparatus for forming a web from plastic material, a casing providing a passage for the plastic material terminating in a slot orifice, means for feeding plastic material through said passage under high pressure, and a perforated pressure-distributing baffle in said passage spaced substantially from said feeding means so as to form a chamber between the end of the feeding means and the pressure distributing means, the width of said passage progressively increasing and the depth decreasing so as to approach that of said orifice, said passage from said feeding means to the orifice being unobstructed except by said perforated baffle, said baffle having a plurality of narrow elongated slots positioned therein to divide the stream of plastic material into a plurality of over-lapped webs in which the edges of the adjacent webs are displaced in the direction of the width of said stream.

2. In an apparatus for forming a web from plastic material, a casing providing a passage for the plastic material terminating in a slot orifice, means for feeding plastic material through said passage under high pressure, and a perforated pressure-distributing baffle in said passage spaced substantially from said feeding means so as to form a chamber between the end of the feeding means and the pressure distributing means, the width of said passage progressively increasing and the depth decreasing so as to approach that of said orifice, said passage from said feeding means to the orifice being unobstructed except by said perforated baffle, said baffle having a plurality of narrow elongated slots forming collectively a substantially elliptical shaped passage in which said slots are arranged at an inclination to its major axis.

FREDERIC A. PARKHURST.